US008944395B2

(12) United States Patent
Bonito et al.

(10) Patent No.: US 8,944,395 B2
(45) Date of Patent: Feb. 3, 2015

(54) GOLF CAR AND MOUNTING SYSTEM FOR A DISPLAY DEVICE INCORPORATED THEREIN

(75) Inventors: Anthony P. Bonito, Davie, FL (US); Perry H. Pierce, Fort Collins, CO (US)

(73) Assignee: Apple Electric Car, Inc., Miami Beach, FL (US)

( * ) Notice: Subject to any disclaimer, the term of this patent is extended or adjusted under 35 U.S.C. 154(b) by 0 days.

(21) Appl. No.: 13/558,684

(22) Filed: Jul. 26, 2012

(65) Prior Publication Data

US 2013/0193173 A1 Aug. 1, 2013

Related U.S. Application Data

(63) Continuation of application No. 12/939,767, filed on Nov. 4, 2010, now abandoned, which is a continuation of application No. 12/229,973, filed on Aug. 28, 2008, now abandoned.

(51) Int. Cl.
*E04G 3/00* (2006.01)
(52) U.S. Cl.
USPC ............... 248/278.1; 248/276.1; 248/917; 248/921; 248/922; 248/923
(58) Field of Classification Search
USPC ............ 248/917–923, 278.1, 286.1, 217.3, 248/276.1; 296/1.1; 293/24.1; 224/548
See application file for complete search history.

(56) References Cited

U.S. PATENT DOCUMENTS

| 5,095,430 | A | * | 3/1992 | Bonito et al. | ............. 700/92 |
| 5,179,447 | A | * | 1/1993 | Lain | ............. 348/837 |
| 5,374,104 | A | * | 12/1994 | Moore et al. | ............. 297/188.16 |
| 5,547,248 | A | * | 8/1996 | Marechal | ............. 297/188.17 |
| 6,007,036 | A | * | 12/1999 | Rosen | ............. 248/286.1 |
| 6,179,263 | B1 | * | 1/2001 | Rosen et al. | ............. 248/278.1 |
| 6,745,065 | B2 | * | 6/2004 | Niwa et al. | ............. 600/424 |

* cited by examiner

*Primary Examiner* — Amy J Sterling
(74) *Attorney, Agent, or Firm* — GrayRobinson, P.A.; Daniel C. Crilly

(57) ABSTRACT

A golf car employs a mounting system to attach a display device to the golf car housing such that the display device is movable so as to facilitate viewing of a display screen of the display device by a user whether the user is located inside or outside the golf car. In one embodiment, the mounting system includes a rigid base member, a swivel member and at least one extension member. The swivel member mechanically connects the display device to the rigid base member and facilitates rotation of the display device about a vertical axis in a range of 0 to about 360 degrees relative to an initial position of the display device. The extension member is connected to the rigid base member and facilitates upward and downward movement of the display device distally from at least one point of attachment of the mounting system to the golf car housing.

16 Claims, 8 Drawing Sheets

US 8,944,395 B2

GOLF CAR AND MOUNTING SYSTEM FOR A DISPLAY DEVICE INCORPORATED THEREIN

CROSS REFERENCE TO RELATED APPLICATIONS

This application is a continuation of U.S. application Ser. No. 12/939,767 filed on Nov. 4, 2010 now abandoned, which is a continuation of U.S. application Ser. No. 12/229,973 filed on Aug. 28, 2008, now abandoned, and is incorporated herein by this reference.

BACKGROUND OF THE INVENTION

1. Field of the Invention

The present invention relates generally to golf cars that incorporate display devices. More particularly, the present invention relates to a golf car and mounting system for a display device incorporated therein that facilitate viewing of the display device's display screen by a user regardless of whether the user is inside or outside the golf car.

2. Description of Related Art

Systems that employ computers on golf cars are well known. Exemplary systems are disclosed in U.S. Pat. No. 5,095,430; U.S. Pat. No. 5,364,093; U.S. Pat. No. 5,689,431; U.S. Pat. No. 5,810,680; U.S. Patent Application Publication No. US 2004/0196181 A1; U.S. Patent Application Publication No. US 2005/0228547 A1; and U.S. Patent Application Publication No. US 2008/0108456 A1. While these patents and publications disclose the use of golf car-mounted display devices to facilitate the dissemination of information to golfers and the receipt of information from golfers, none of the patents or publications disclose mounting of a display device so as to allow a golfer to view the device's display screen from any position, regardless of whether the golfer is inside or outside the golf car. For example, none of the aforementioned patents or publications disclose a display device mounting system that would allow a golfer to readily view a prerecorded video of the golfer's swing, which is playing on the display, while the golfer is standing adjacent his or her ball on the fairway preparing to hit the golfer's next shot.

There have been numerous approaches to mounting display devices together with computing devices and/or in vehicles. For example, U.S. Pat. No. 7,133,280 discloses a multi-axial hinge assembly which enables clockwise and counterclockwise rotation of a display device attached to a hybrid notebook/tablet personal computer (PC) relative to a vertical axis. However, the disclosed hinge only allows the display screen to be effectively rotated through a range of 0-180 degrees from its home position facing the PC's keyboard. Thus, the disclosed mounting assembly would not permit viewing of the screen from any location about the PC without also moving the PC. Additionally, while the hinge also permits 180 degree rotation of the display screen about a horizontal axis to permit it to be folded in a clamshell fashion, the mounting assembly does not facilitate substantial changes in height as may be necessary to compensate for variations in the contours of golf courses.

As another example, U.S. Pat. No. 6,412,848 discloses a display monitor system for use in a vehicle. The disclosed display system is mountable to the ceiling of the passenger compartment of the vehicle and allows rotation of the display screen about a horizontal axis in a clamshell fashion from zero to about ninety degrees. The disclosed display system does not facilitate rotation of the display screen about a vertical axis. Thus, the disclosed mounting system is designed to allow viewing of the display screen by users positioned in the rear of the vehicle when the display screen has been rotated into its open position. Since the disclosed display screen cannot be rotated about a vertical axis or have its height modified, it is not readily suited for use by golfers who may want to view the screen from outside the golf car or when not positioned on only one particular side of the screen.

As yet another example of a display mounting system, U.S. Pat. No. 6,874,738 discloses a display mounting system configured to provide for vertical adjustment of a height of a display screen. However, such mounting system limits vertical and horizontal rotation of the display screen to about 90 degrees. Thus, the mounting system is most suitable for mounting a display device, such as a liquid crystal display (LCD) or a plasma display, for a PC or TV set in an indoor environment. Additionally, the limited mobility of the disclosed mounting system would not make the mounting system readily suited for use by golfers who could be positioned at various locations outside a golf car.

As a final example, U.S. Pat. No. 4,220,310 discloses an extensible display mounting assembly that includes a telescoping pole assembly. The telescoping pole assembly is extensible to a desired length and includes, at its extensible end, selectively shaped fixtures for releasably positioning a magnetically adherable mounting member adapted to support a display device. The assembly is suitable for magnetically mounting display materials, such as advertisements, posters, or decorations, at elevated locations above ground level. The assembly is not robust or rigid enough to support a larger or heavier display device, such as an LCD or plasma display screen. Further, the assembly does not provide any mechanism for rotating the display device horizontally or vertically to facilitate viewing at various angles.

In view of the foregoing, a need exists for a golf car and display device mounting system for use therein that overcome the shortcomings of the prior art and facilitate viewing of a display screen mounted to a golf car regardless of whether a user is inside or outside the golf car.

BRIEF DESCRIPTION OF THE DRAWINGS

The accompanying figures, wherein like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
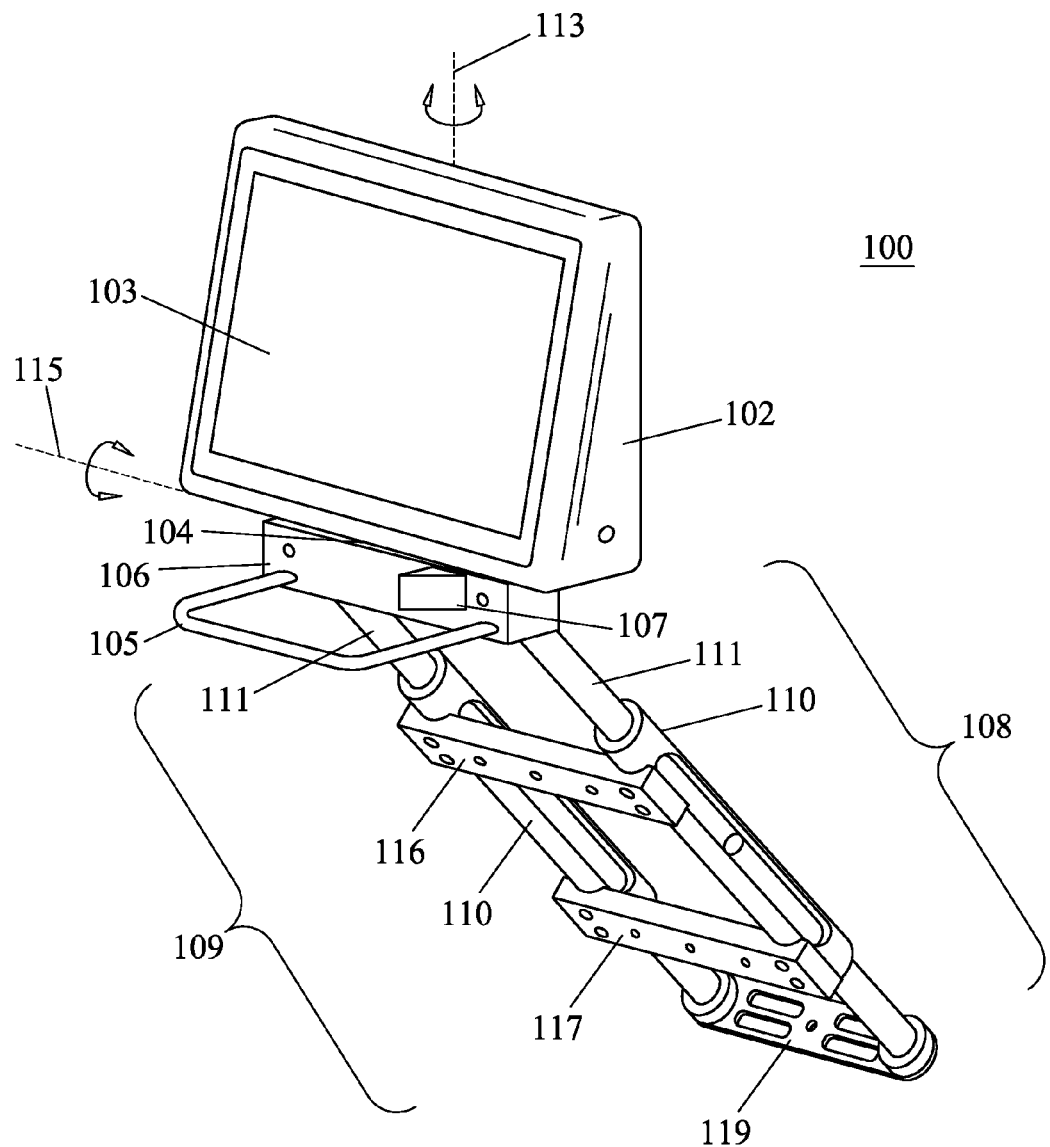
FIG. 1 is a perspective view of a display device mounting system with a display device in a raised configuration in accordance with a first exemplary embodiment of the present invention.

Before describing in detail exemplary embodiments that are in accordance with the present invention, it should be observed that the embodiments reside primarily in combinations of apparatus components related to implementing a golf car and a display device mounting system incorporated into a golf car. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element. Additionally, the term "golf car," as used herein and in the appended claims, refers to any motorized vehicle, whether electric, hydrogen, or fuel-propelled, which is used on a golf course to transport golfers and/or their equipment. The terms "golf car," "golf cart," "cart," and "car" are used interchangeably herein.

Generally, the present invention encompasses a golf car and a display device mounting system for use therein. In accordance with one embodiment of the present invention, the golf car includes a display device, a golf car housing, and a mounting system for attaching the display device to the golf car housing. The display device displays at least play-related or round-related information to a user or users of the golf car on a display screen of the device. The mounting system attaches the display device to the golf car housing such that the display device is movable when attached to the mounting system so as to facilitate viewing of the display screen by the user(s) whether the user(s) is located inside or outside the golf car housing.

In one embodiment, the mounting system includes a rigid base member, a swivel member mechanically connecting the rigid base member to the display device, and at least one extension member connected to the rigid base member and the golf car housing. The swivel member facilitates rotation of the display device over a range of 0 to about 360 degrees (either full, 360 degree rotation clockwise or counterclockwise, or rotation 180 degrees clockwise and 180 degrees counterclockwise relative to an initial or home position to provide about a 360 degree range of rotation). The extension member(s) facilitates movement of the display device distally relative to one or more points of attachment of the extension member(s) to the golf car housing (e.g., up and down at an angle relative to a surface, such as a dashboard, of the golf car).

By configuring a golf car and its display device mounting system in such a manner, the present invention enables the display screen of the display device to be positioned such that users of the golf car can view the display screen when sitting in the golf car or standing proximate the golf car (e.g., prior to or after hitting a golf ball). To provide such viewing flexibility, the mounting system enables the display device, while remaining secured to the golf car, to be raised and rotated such that a golfer standing outside the golf car can readily view the display screen. The mounting system also enables the display device to be lowered so as to not obscure the view of a user driving the golf car when the golf car is in motion.

Figure 6:
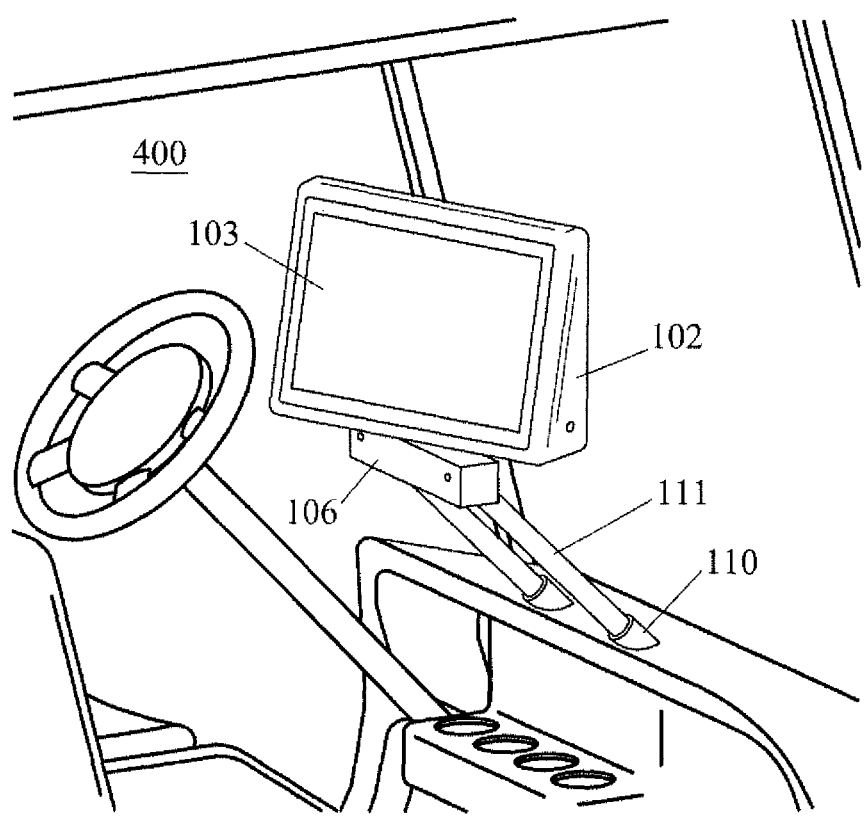
FIG. 6 is a perspective view of a portion of a golf car incorporating the display device mounting system of FIG. 3 in accordance with an exemplary embodiment of the present invention.
Figure 7:
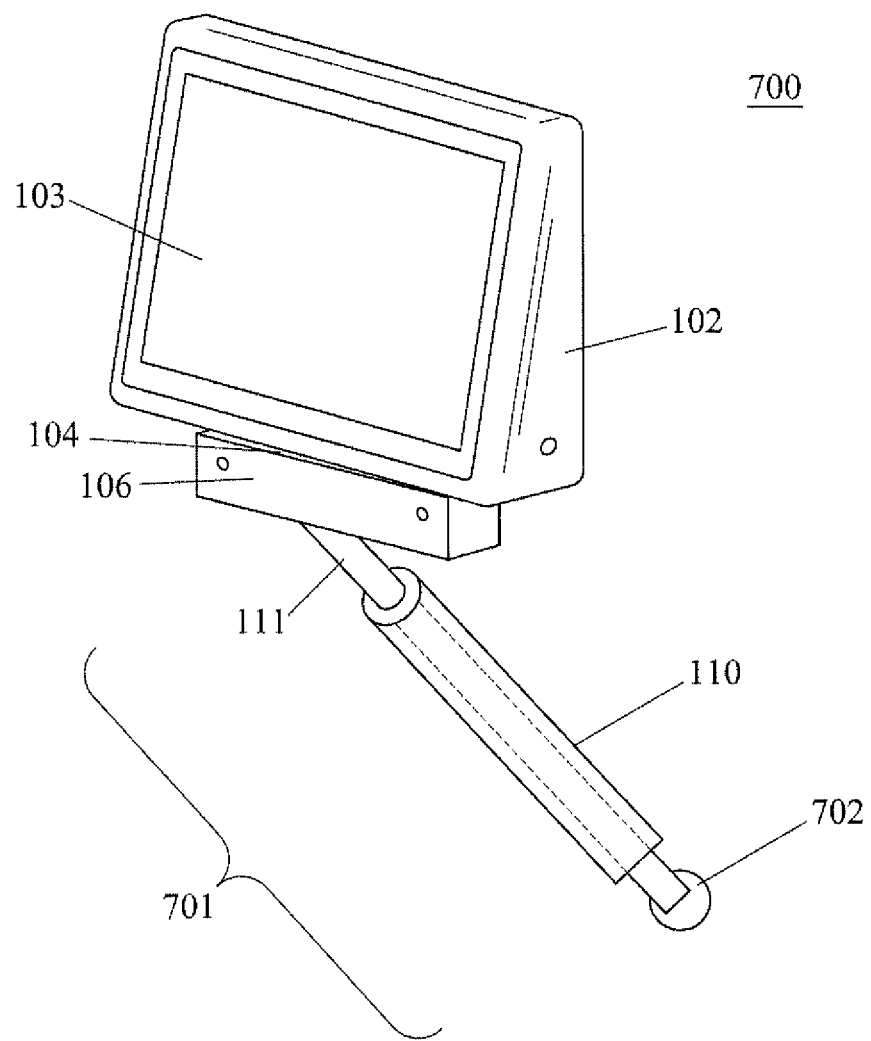
FIG. 7 is a perspective view of a display device mounting system with a display device in a raised configuration in accordance with a second exemplary embodiment of the present invention.
Figure 8:
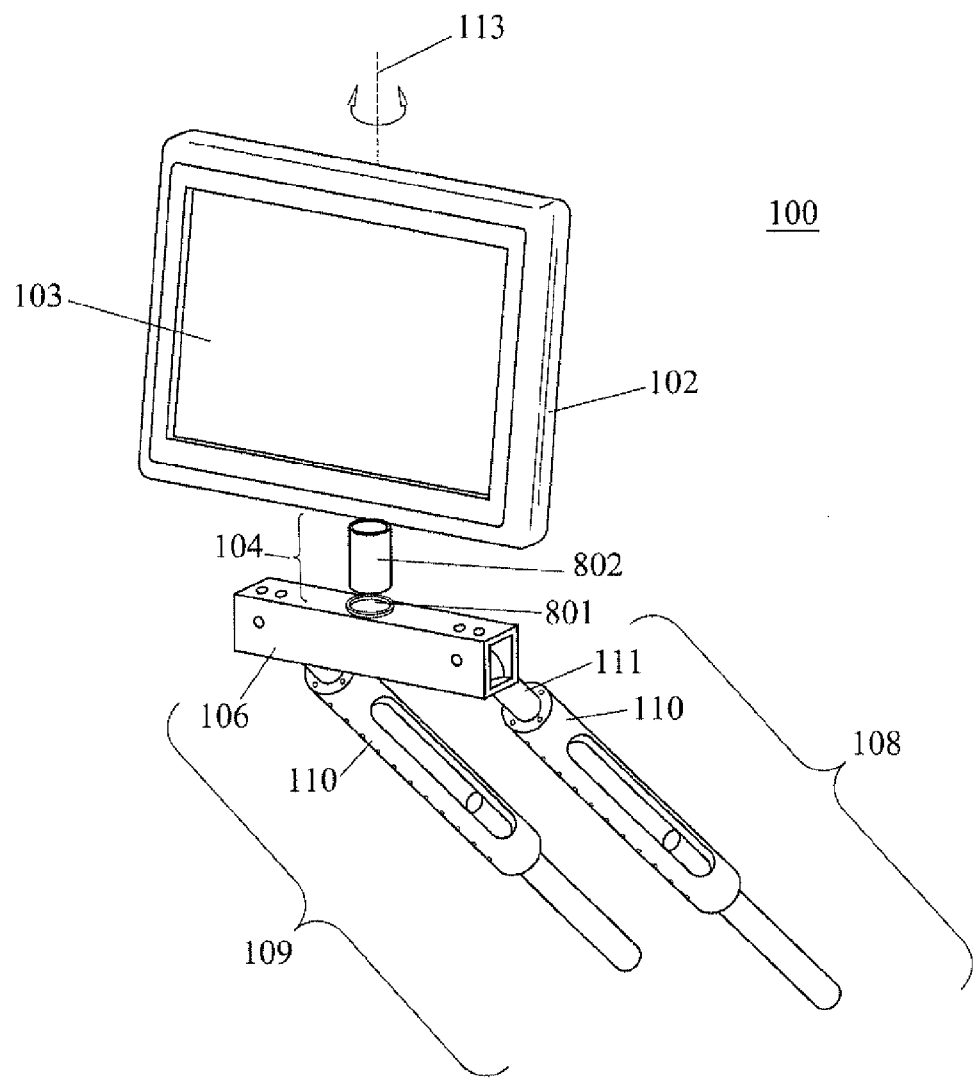
FIG. 8 is an exploded perspective view of the display device mounting system of FIG. 1 in accordance with the first exemplary embodiment of the present invention.

The present invention can be more readily understood with reference to FIGS. 1-8, in which like reference numerals designate like items. FIGS. 1 and 8 depict a display mounting system 100 for use in a golf car to attach a display device 102 to a housing of a golf car in accordance with a first exemplary embodiment of the present invention. The display device 102 may be a liquid crystal display (LCD), a plasma display, a dot matrix display, a transreflective backlit display, or any other display technology that enables viewing of textual, graphical, and/or video information. The display device 102 may display a variety of information, including, but not limited to: (a) golf play-related information, such as an electronic score card, distance-to-the-hole information, a layout of the current hole and/or the entire golf course, a video flyover of the current hole, a notepad, a list of clubs, tee times, and/or leader boards; (b) advertisements; (c) electronic commerce information; (d) stock reports; (e) sports scores; (f) news headlines; and any other textual, graphic or video information that may be of interest to a golfer or other user. If the display device 102, or the control device (not shown) from which the display device 102 receives its information, is configured with an appropriate wireless receiver and television signal (e.g., MPEG) decoder, the display device 102 may also display live television in addition to or in place of the other displayed information. Other exemplary information that may be displayed on the display device 102 is disclosed in U.S. Patent Application Publication No. US 2008/0108456 A1, which is hereby incorporated by this reference. The display device 102 includes a display screen 103 on which the information is displayed by the display device 102.

According to the embodiment of FIGS. 1 and 8, the exemplary mounting system 100 includes a swivel member 104, a rigid base member 106, and a pair of extension members 108, 109. The swivel member 104 mechanically connects the display device 102 to the rigid base member 106 so as to permit the display device 102 to be horizontally rotated about a vertical pivot axis 113. In one embodiment, the swivel member 104 includes a metal or plastic cylindrical member 802 positioned within a circular or cylindrical opening 801 in the rigid base member 106. The opening 801 may be fitted with a plastic sleeve that snugly surrounds the cylindrical member 802 when the cylindrical member 802 is positioned within the opening 801. The snugness or friction between the cylindrical member 802 and the plastic sleeve is preferably such that after the display device 102 has been rotated to a desired position, the display device 102 remains in that position until moved by the user. This embodiment facilitates approximately 360 degree horizontal rotation of the display device 102 in either or both directions. In an alternative embodiment, the cylindrical member 802 may include a pin or other stop member (not shown) that would fit into a groove in the wall of the opening 801 so as to permit clockwise and counterclockwise horizontal rotation of the display device 102 from 0 degrees to about 180 degrees, thereby providing about 360 degrees of horizontal rotation of the display device 102 relative to its initial or home position. In the alternative embodiment, the stop member would prevent the swivel member 104 from being rotated beyond the intended approximately 180 degrees in each direction.

In a further embodiment, the swivel member 104 may be multi-axial, thereby facilitating both horizontal rotation as discussed above, as well as vertical rotation of the display device 102 about a horizontal axis 115 that is substantially perpendicular to the vertical axis 113. In one embodiment, the swivel member 104 facilitates rotation of the display device 102 about the horizontal axis 115 in the range of 0 to about 90 degrees in a direction opposite the display screen 103, where the zero degree reference corresponds to the display device 102 being fully upright. In an alternative embodiment, the swivel member 104 facilitates approximately 180 degree rotation of the display device 102 about the horizontal axis 115. The swivel member 104 may be implemented using a multi-axial hinge, such as the hinge disclosed in U.S. Pat. No. 7,133,280 B2, which is incorporated herein by this reference, modified to permit approximately 180 degree rotation about the vertical axis 113 in both the clockwise and counterclockwise directions relative to a home position. The swivel member 104 may be alternatively implemented using a ball and socket mechanism, a pivoting set of arms, or a set of parallel or scissors-style linkages.

The rigid base member 106 supports the swivel member 104 and may be fabricated as a metal or plastic (e.g., polyvinylchloride (PVC)) bar or tube sufficient in length to allow attachment of the base member 106 to the pair of parallel extension members 108, 109. The base member 106 may be extruded or constructed using any other known fabrication method. In one embodiment, the base member 106 is a hollow structure fabricated from approximately 1/8" inch (approximately 3.2 millimeter) thick metal or plastic that defines a cavity in which the swivel member 104 is positioned and connected to the base member 106. In an exemplary embodiment, the base member is approximately 10 inches (approximately 25.4 centimeters) long by approximately 2 inches (approximately 5.1 centimeters) wide. The base member 106 may optionally include or be connected to a handle 105 to assist a user of a golf car containing the mounting system 100 in raising and lowering the display device 102.

The extension members 108, 109 are oriented generally parallel to one another and are connected in a conventional manner to the base member 106 to facilitate movement of the display device 102 distally from points of attachment of the extension members 108, 109 to the golf car housing. An exemplary golf car containing the mounting system of FIG. 1 is discussed in more detail below with respect to FIG. 4.

In one embodiment, each of the extension members 108, 109 is a telescoping extension member that includes an outer tube 110 and an inner tube 111. Alternatively, the extension members 108, 109 may be implemented using any other mechanical, electric, pneumatic, or hydraulic means, such as, but not limited to, pivoting or sliding rails or arms, accordion or scissors-style arms, drawer slide, four or more bar linkages, magnetic levitation, cables or belts, drive screws, pneumatic cylinder ball detent, electronic solenoid, and mechanical clamps.

When the extension members 108, 109 are implemented as telescoping members, the inner tube 111 moves in and out of a chamber defined by the outer tube 110 responsive to a force exerted on the inner tube 111. The force may be manual, such as when a user pulls up or pushes down on the handle 105, the display device 102, or the base member 106. When the mounting system 100 is designed for use of manual force to raise and lower the display device 102, the mounting system 100 may include conventional cam lock mechanisms or constricting brakes or clamps to enable the inner tubes 111 to be locked or clamped at desired height positions.

Alternatively, the inner tube adjusting force may be electromechanically generated by a motor (not shown), such as a conventional hydraulic motor, located in or on the golf car. In such a case, the base member 106 may optionally include or support a switch 107 that activates and/or controls the motor to enable a user to select when to raise and lower the display device 102. In one embodiment, the inner tube 111 includes a cavity through which wires and cabling may be run between the display device 102 and its source controller (not shown), which may be installed in the dashboard or other location of the golf car, as well as between the switch 107 and the motor (when used).

To improve the overall strength of the mounting system 100, especially when designed to permit manual force to be used to raise and lower the display device 102, the mounting system 100 may optionally include one or more rigid support members 116, 117, 119. The support members 116, 117, 119, when used, are attached in a perpendicular manner to the pair of extension members 108, 109 to maintain the parallel arrangement of the extension members 108, 109 in the presence of the manual or other forces exerted on the mounting system 100. When the extension members 108, 109 are telescoping members as shown in FIG. 1, support members 116 and 117 may be attached to the outer tubes 110 of the extension members 108, 109; whereas, support member 119 may be attached to the inner tubes 111 of the extension members 108, 109. In such a manner, the support members 116, 117, 119 increase the strength of the extension members 108, 109 and promote parallel movement of the inner tubes 111. Additionally, support member 119 functions as an upward travel stop or travel limit for the inner tubes 111 and, accordingly, the display device 102. One or more of the support members 116, 117, 119 may be fastened to the golf car housing or chassis to secure the mounting system 100 to the golf car and provide further support for the mounting system 100.

The optional support members 116, 117, 119 are positioned between the base member 106 and the primary point or points of attachment of the mounting system 100 to the golf car housing or chassis. The point or points of attachment of the mounting system 100 to the golf car housing may be provided by appropriate hardware connecting some or all of the support members 116, 117, 119 to the golf car chassis. As detailed above, the mounting system 100 allows the display device 102 to be movable such that a user can view the display screen 103 regardless of whether the user is located inside or outside the golf car and whether the user is positioned at virtually any angle relative to the inside compartment of the golf car.

Figure 2:
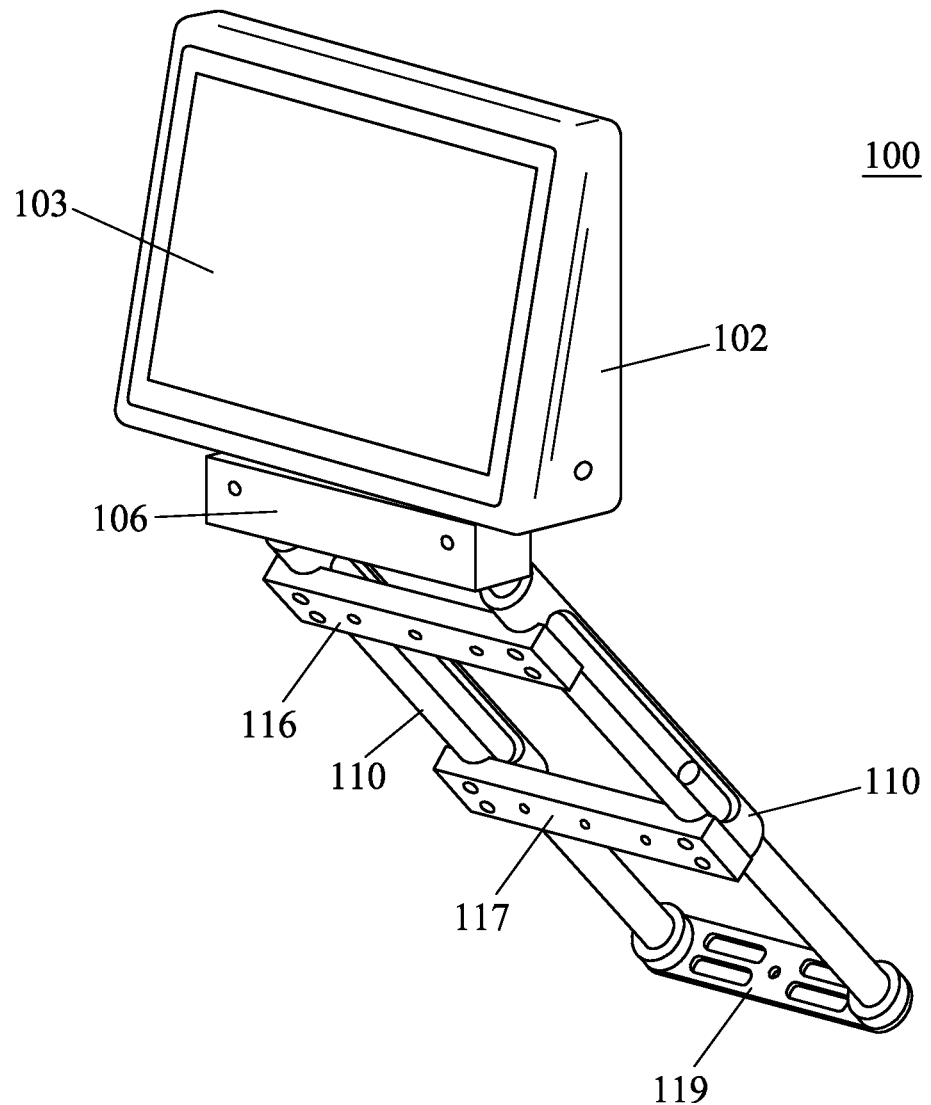
FIG. 2 is a perspective view of the display device mounting system of FIG. 1 with the display device in a lowered configuration in accordance with an exemplary embodiment of the present invention.

FIG. 2 illustrates a perspective view of the display device mounting system 100 of FIG. 1 with the display device 102 in a lowered configuration in accordance with an exemplary embodiment of the present invention. As illustrated in FIG. 2, lowering the display device 102 causes the extended inner tubes 111 to retract into the outer tubes 110 of the extension members 108, 109 when the extension members 108, 109 are implemented as telescoping members.

Figure 3:
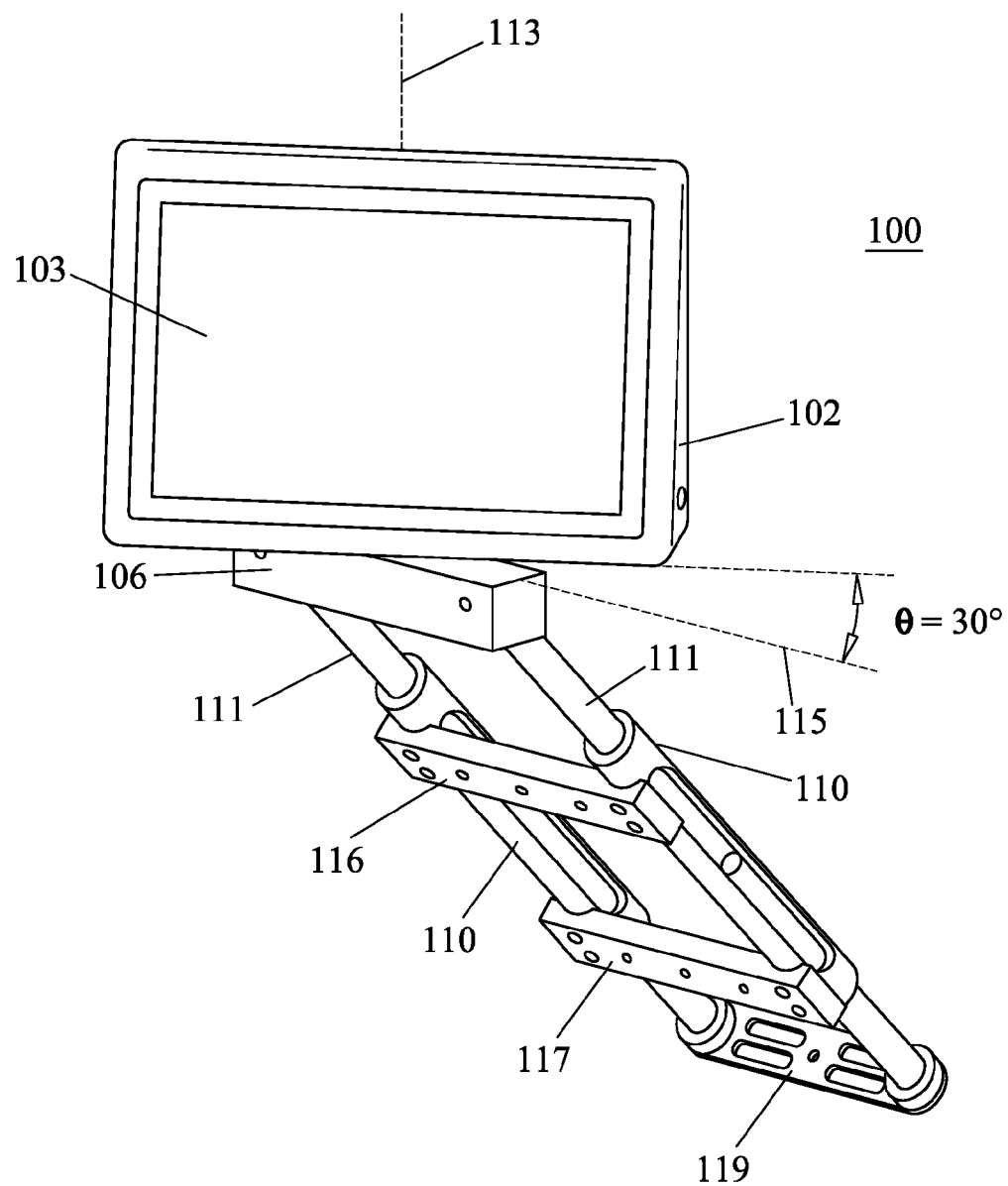
FIG. 3 is a perspective view of the display device mounting system of FIG. 1 with the display device rotated horizontally counterclockwise about 30 degrees relative to an initial position in accordance with an exemplary embodiment of the present invention.

FIG. 3 illustrates a perspective view of the display device mounting system 100 of FIG. 1 with the display device 102 rotated horizontally counterclockwise about 30 degrees relative to an exemplary initial or home position of the display device 102 along horizontal axis 115. In this case, the initial or home position of the display device 102 is such that the display screen 103 is rearward facing (e.g., facing the rear of a golf car in which the mounting system 100 is installed).

Figure 4:
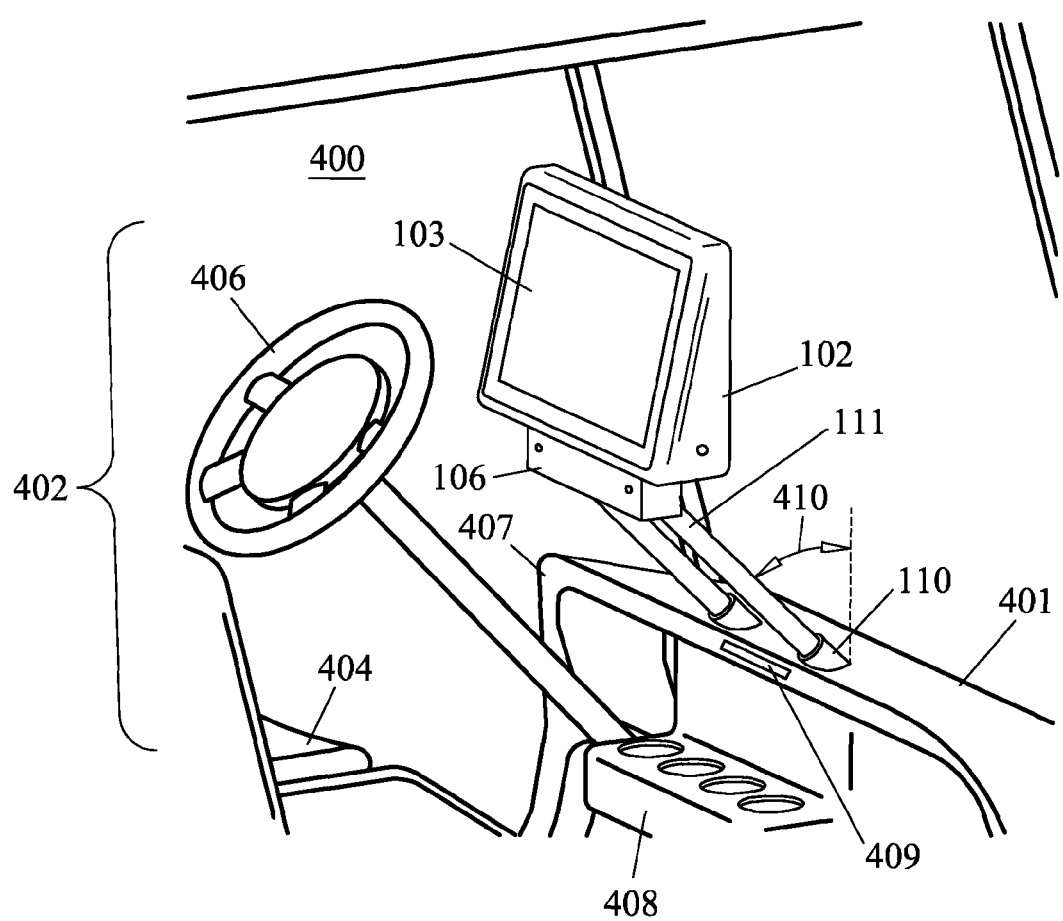
FIG. 4 is a perspective view of a portion of a golf car incorporating the display device mounting system of FIG. 1 and showing the display device in a raised position in accordance with an exemplary embodiment of the present invention.
Figure 5:
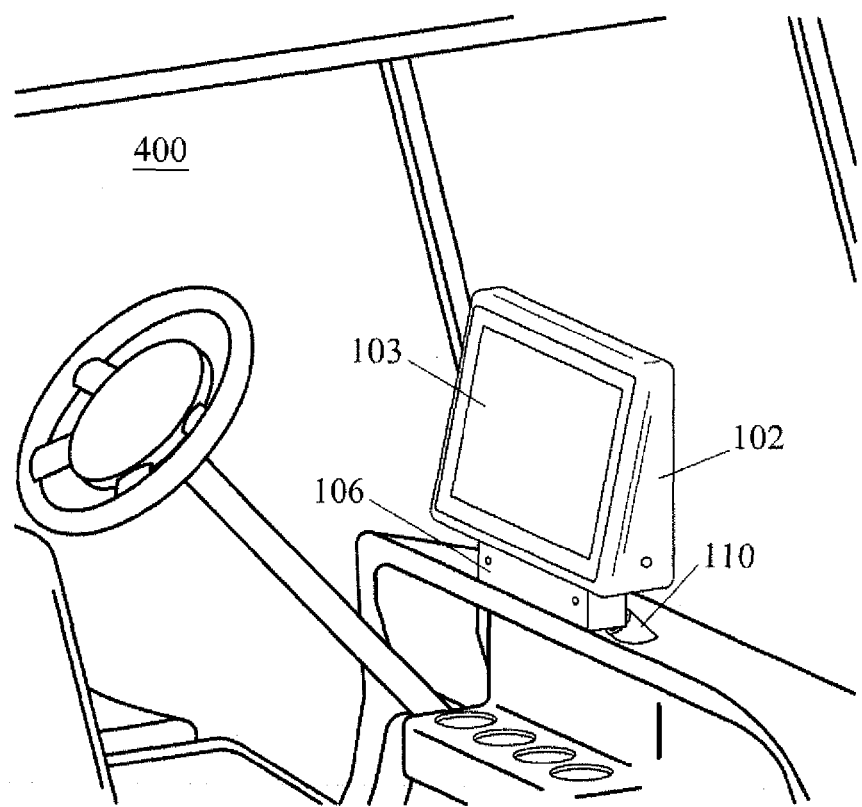
FIG. 5 is a perspective view of a portion of a golf car incorporating the display device mounting system of FIG. 2 and showing the display device in a lowered position in accordance with an exemplary embodiment of the present invention.

FIGS. 4-6 depict the exemplary mounting system 100 of FIG. 1 installed in and forming part of a golf car 400. FIGS. 4-6 correspond to FIGS. 1-3 in that FIGS. 4-6 illustrate the respective positioning of the display device 102 as illustrated in FIGS. 1-3 when the mounting system 100 is installed in the golf car 400. As illustrated in FIG. 4, the golf car 400 includes a golf car housing 401 that defines a riding compartment 402 containing, inter alia, a seat 404, a steering wheel 406, a dashboard 407, cup holders 408, golf tee holders (not shown), and various other known elements.

The mounting system 100 may be attached to the golf car housing 401 under the dashboard 407 by mounting the support members 106, 107 to the housing 401 using known fasteners, such as screws or bolts. The dashboard 407 may be modified to accept the mounting system 100 by, for example, including apertures through which the extension members 108, 109, or portions thereof, may pass to permit connection to the rigid base member 106 or by including semi-circular or arched recesses or grooves in an underside and/or front surface of the dashboard 407 to permit passage of the extension members 108, 109. Alternatively, the mounting system 100 may be connected to the golf car housing 401 such that no modification to the dashboard 407 is necessary (e.g., by attaching the mounting system 100 to a floor or wall of the golf car housing 401 such that the extension members 108, 109 may pass between the dashboard 407 and the seat 404). In the event that the mounting system 100 includes a motor (not shown) to facilitate automatic raising, lowering, and/or rotation of the display device 102, the dashboard 407 or some other portion of the golf car 300 may be equipped with a switch 409 for use in controlling the operation of the motor.

When installed in the golf car 400, the mounting system 100 allows the display device 102 to be moved such that the display screen 103 may be viewed by a user whether the user is located inside or outside the golf car 400. For example, when the extension members 108, 109 are telescoping members and the display device 102 has been raised such that the inner tubes 111 of the extension members 108, 109 are fully or substantially extended as depicted in exemplary form in FIG. 4, the display device 102 may be rotated as illustrated in exemplary form in FIG. 6 to allow a user standing outside the golf car 400 to view the display screen 103. Alternatively, the display device 102 may be lowered and placed in its rest position, as illustrated in exemplary form in FIG. 5, or rotated appropriately, as illustrated in exemplary form in FIG. 6, to allow a user sitting inside the golf car 400 to view the display screen 103.

Referring back to FIG. 4, the mounting system 100 may be installed in the golf car 400 such that, when the extension members 108, 109 are extended, they extend upward at an angle 410 toward the rear of the golf car 400. Alternatively, the mounting system 100 may be installed such that, when the extension members 108, 109 are extended, they extend straight up vertically or at an angle toward the front of the golf car 400. The location, configuration and orientation of the mounting system 100, as installed in the golf car 400, may be chosen to best facilitate viewing of the display screen 103 by the users.

FIG. 7 illustrates an alternative embodiment of a mounting system 700 in accordance with the present invention. In this embodiment, the mounting system 700 includes a single extension member 701 instead of the pair of parallel extension members 108, 109 that were included in the embodiment depicted in FIG. 1. Otherwise, the mounting system 700 includes the other primary elements of the mounting system 100 of FIG. 1, such as the display 102, the swivel member 104, and the rigid base member 106. In the embodiment depicted in FIG. 7, the extension member 701 is a telescoping member and, similar to the telescoping members depicted in FIG. 1, includes an outer tube 110 and an inner tube 111. The extension member 701 is connected at one end to the base member 106 and at the other end to a bracket 702 or other means of attaching the extension member 701 to the golf car housing or chassis. Since this embodiment uses only a single extension member 701, the extension member 701 may be attached to a central area or portion of the rigid base member 106 to balance the force applied to the extension member 701 during operation of the display device 102 and mounting system 700.

The present invention encompasses a golf car and a display device mounting system for use therein. With this invention, a display screen of a display device mounted in the golf car can be viewed by a golfer whether he or she is sitting in the golf car or standing proximate the golf car (e.g., prior to or after hitting a golf ball). The mounting system of the present invention provides enhanced viewing flexibility of an attached display device by enabling the attached display device, while remaining secured in a golf car, to be raised and rotated such that a golfer or other user standing outside the golf car can readily view the display screen of the display device. The mounting system also enables the display device to be lowered so as to not obscure the view or movement of a user driving the golf car when the golf car is in motion.

Benefits, other advantages, and solutions to problems have been described above with regard to specific embodiments of the present invention. However, the benefits, advantages, solutions to problems, and any element(s) that may cause or result in such benefits, advantages, or solutions to become more pronounced are not to be construed as a critical, required, or essential feature or element of any or all the claims. The invention is defined solely by the appended claims including any amendments made during the pendency of this application and all equivalents of those claims as issued.

What is claimed is:

1. A golf car for use by a user, the golf car comprising:
    a display device for displaying at least play-related information on a display screen thereof;
    a golf car housing defining a compartment, the compartment including at least one seat to be occupied by the user; and
    a mounting system for mounting the display device to the golf car housing such that the display device is movable when attached to the mounting system so as to facilitate viewing of the display screen by the user whether the user is located inside or outside the golf car;

wherein the mounting system includes:
a rigid base member;
a swivel member mechanically connecting the display device to the rigid base member, the swivel member facilitating rotation of the display device relative to an initial position of the display device; and
at least one extension member mounted at one end to the rigid base member and at another end to the golf car housing, the at least one extension member facilitating movement of the display device distally from at least one point of attachment of the mounting system to the golf car housing.

2. The golf car of claim 1, wherein the swivel member facilitates rotation of the display device in a range of 0 to about 360 degrees relative to the initial position of the display device.

3. The golf car of claim 2, wherein the at least one extension member comprises a pair of parallel extension members.

4. The golf car of claim 3, wherein the pair of parallel extension members comprises a pair of telescoping extension members.

5. The golf car of claim 3, further comprising at least one rigid support member attached to and separating the pair of parallel extension members, the rigid support member being positioned between the rigid base member and the at least one point of attachment of the mounting system to the golf car housing.

6. The golf car of claim 3, wherein the pair of parallel extension members extends upward at an angle toward a rear of the golf car.

7. The golf car of claim 1, wherein the at least one extension member comprises at least one telescoping extension member.

8. The golf car of claim 1, wherein the at least one extension member extends upward at an angle toward a rear of the golf car.

9. The golf car of claim 1, wherein the mounting system further comprises:
a handle connected to the rigid base member, wherein the handle is usable to extend and retract the at least one extension member and correspondingly raise and lower the display device.

10. A golf car for use by a user, the golf car comprising:
a display device for displaying at least play-related information on a display screen thereof;
a golf car housing defining a compartment, the compartment including at least one seat to be occupied by the user; and
a mounting system for mounting the display device to the golf car housing, wherein the mounting system includes:
a rigid base member;
a swivel member mechanically connecting the display device to the rigid base member, the swivel member facilitating rotation of the display device relative to an initial position of the display device; and
at least one extension member mounted at one end to the rigid base member and at another end to the golf car housing, the at least one extension member facilitating movement of the display device distally from at least one point of attachment of the mounting system to the golf car housing.

11. The golf car of claim 10, wherein the at least one extension member comprises at least one telescoping extension member.

12. The golf car of claim 10, wherein the at least one extension member extends upward at an angle toward a rear of the golf car.

13. The golf car of claim 10, wherein the mounting system further includes:
a handle connected to the rigid base member, wherein the handle is usable to extend and retract the at least one extension member and correspondingly raise and lower the display device.

14. The golf car of claim 10, wherein the swivel member facilitates rotation of the display device in a range of 0 to about 360 degrees relative to the initial position of the display device.

15. The golf car of claim 10, wherein the swivel member facilitates rotation of the display device horizontally about a vertical pivot axis.

16. The golf car of claim 1, wherein the swivel member facilitates rotation of the display device horizontally about a vertical pivot axis.

* * * * *